(12) United States Patent
Naqvi et al.

(10) Patent No.: US 11,750,380 B2
(45) Date of Patent: Sep. 5, 2023

(54) STORING AND RETRIEVING USER DATA USING JOINT, NON-CORRELATIVE, IRREVERSIBLE AND PRIVATE INDEXICAL EXPRESSIONS

(71) Applicant: Sensoriant, Inc., Cedar Knolls, NJ (US)

(72) Inventors: Shamim A. Naqvi, Morristown, NJ (US); Robert Frank Raucci, New York, NY (US); Goutham Puppala, Basking Ridge, NJ (US)

(73) Assignee: SAFELISHARE, INC., Morristown, NJ (US)

( * ) Notice: Subject to any disclaimer, the term of this patent is extended or adjusted under 35 U.S.C. 154(b) by 369 days.

(21) Appl. No.: 16/942,032

(22) Filed: Jul. 29, 2020

(65) Prior Publication Data
US 2021/0034299 A1 Feb. 4, 2021

Related U.S. Application Data

(60) Provisional application No. 62/879,642, filed on Jul. 29, 2019.

(51) Int. Cl.
*H04L 9/08* (2006.01)
*G06F 3/06* (2006.01)
*H04L 9/32* (2006.01)

(52) U.S. Cl.
CPC .......... *H04L 9/0863* (2013.01); *G06F 3/0604* (2013.01); *G06F 3/0622* (2013.01);
(Continued)

(58) Field of Classification Search
CPC .... G06F 3/0659; G06F 3/0604; G06F 3/0622; G06F 3/0644; G06F 3/0673;
(Continued)

(56) References Cited

U.S. PATENT DOCUMENTS

| | | | | |
|---|---|---|---|---|
| 10,657,283 | B2 * | 5/2020 | Eigner | ............... G06F 21/6227 |
| 2006/0053288 | A1 * | 3/2006 | Stern | ..................... H04L 9/3218 |
| | | | | 713/168 |

(Continued)

FOREIGN PATENT DOCUMENTS

| | | | | |
|---|---|---|---|---|
| CA | 3053185 A1 * | 2/2018 | ............. | G06Q 20/12 |
| WO | WO 2013101245 A1 * | 12/2011 | ........... | H04L 9/3226 |
| WO | WO 2021048549 A1 * | 9/2019 | ........... | H04L 9/3255 |

*Primary Examiner* — Jeremy S Duffield (57) ABSTRACT

In accordance a method for storing a dataset, the dataset may be split into fragments that are distributed among different nodes of a network for storage. The fragments may then be retrieved as and when needed and re-assembled. The method allows multiple different fragments to be stored and re-assembled on demand. The dataset is initially stored in a user computing device in communication with a data storage system and a custodial entity. The fragments are stored so that no single computing entity in the storage system or the custodian ever contains or gains knowledge of all the fragments. Additionally, the user computing device that was initially in possession of the dataset and which caused the fragments to be stored in the storage system may be replaced with different user computing devices without losing the capability of storing and re-assembling the user data on demand by the replacement user computing device.

18 Claims, 3 Drawing Sheets

(52) U.S. Cl.
CPC .......... *G06F 3/0644* (2013.01); *G06F 3/0659* (2013.01); *G06F 3/0673* (2013.01); *H04L 9/085* (2013.01); *H04L 9/0866* (2013.01); *H04L 9/3247* (2013.01); *H04L 9/3271* (2013.01)

(58) Field of Classification Search
CPC ... H04L 9/0863; H04L 9/0866; H04L 9/3247; H04L 9/3271
USPC .......................................................... 713/176
See application file for complete search history.

(56) References Cited

U.S. PATENT DOCUMENTS

| | | | |
|---|---|---|---|
| 2008/0181413 A1* | 7/2008 | Yi ........................... | H04L 9/302 380/279 |
| 2012/0185397 A1* | 7/2012 | Levovitz ................ | G06Q 20/40 705/44 |
| 2017/0063831 A1* | 3/2017 | Arnold ................... | H04L 9/3226 |
| 2020/0005295 A1* | 1/2020 | Murphy ................. | G06Q 20/405 |
| 2020/0127837 A1* | 4/2020 | Kaladgi .................. | H04L 63/10 |
| 2021/0006933 A1* | 1/2021 | Dean ....................... | G16Y 40/10 |
| 2021/0203657 A1* | 7/2021 | Huapaya .................. | H04L 9/50 |
| 2021/0240844 A1* | 8/2021 | Arava ...................... | G06F 21/78 |

* cited by examiner

STORING AND RETRIEVING USER DATA
USING JOINT, NON-CORRELATIVE,
IRREVERSIBLE AND PRIVATE INDEXICAL
EXPRESSIONS

CROSS-REFERENCE TO RELATED APPLICATIONS

This application claims the benefit of U.S. Provisional Application Ser. No. 62/879,642, filed Jul. 29, 2019, the contents of which are incorporated herein by reference.

BACKGROUND

Distributed and decentralized systems are used in many computing applications where scalability and reliability are important requirements. Applications in transaction processing, digital rights management, cryptocurrencies, travel arrangements, access to resources, healthcare data management, financial transactions, etc., make heavy use of distributed and decentralized systems of interconnected computers, storage systems and components. Users typically gain access to such applications by presenting one or more personal data items, called keys or cryptographic credentials. The latter are stored in user computing devices such as mobile handsets, tablets, or personal computers. There is concern that a loss of or malicious attacks on a user computing device may compromise the user's access rights. The present invention addresses these and other technological problems.

SUMMARY

In accordance with one aspect of the method, techniques and systems described herein, a dataset may be split into fragments that are distributed among different nodes of a network for storage. The fragments may then be retrieved as and when needed and re-assembled. The method allows multiple different fragments to be stored and re-assembled on demand. The dataset is initially stored in a user computing device in communication with a data storage system and a computing system (referred to herein as a custodian or custodial entity). The fragments of the dataset are stored so that no single computing entity in the storage system or the custodian ever contains or gains knowledge of all the fragments. (Alternatively, the user device is the only computing entity that contains the entire user data at the initial instant or at the instant of re-assembly. Every other entity, at best, may only possess a proper subset of the fragments.) In addition, the user computing device that was initially in possession of the dataset and which caused the fragments to be stored in the storage system may be replaced with different user computing devices without losing the capability of storing and re-assembling the user data on demand by the replacement user computing device. In this way the method allows re-assembly of the original dataset in case the user computing device that originally caused the dataset to be stored is lost, or its memory gets corrupted and it is replaced by a new user computing device. Moreover, an arbitrary user (different from the original user) is not able to use the user computing device to re-assemble the fragments stored by the original user.

In the event of death of the owner of the user computing device, a suitably appointed beneficiary may re-assemble the original owner's data on the beneficiary's user computing device. These and other properties of the subject matter described herein lead to a new trust model which entails that all user data is always under the control of the user such that no other entity in the network needs to be trusted with it in its entirety. Thus, privacy, continuity of service (in case of death or loss of device), and security of the dataset is preserved.

The methods, systems and techniques described herein allow more efficient, decentralized and potentially redundant storage of data that are accessible from multiple storages while simultaneously maintaining security and privacy. These techniques may be applicable not only to an individual's user data, but also to large datasets maintained by commercial enterprises.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure.

DETAILED DESCRIPTION

A "digital wallet" (or simply a "wallet") is a software program usually available on user computing devices (e.g., mobile phones such as smart phones, tablet computers, personal computers, etc.) that stores, inter alia, personal data called keys or credentials that allow a user to gain access to various applications and systems. (We use the two terms, credentials and keys, herein interchangeably.) If the user computing device is lost or the data on the device gets corrupted, users may lose their access rights. If a malicious person gains access to the personal data, users may suffer the consequences of unauthorized access to their data records.

To circumvent the above problems, some wallets store the keys (credentials) in a server, e.g., cloud computing environment, and retrieve the same as and when needed. Such solutions are unsatisfactory since the users now have to trust the service provider with their sensitive keys and the latter may themselves suffer data outages or data theft because of cyber-attacks. Furthermore, the basic vulnerability remains unresolved since the users still have to store some credentials on their user computing devices to authenticate themselves to the (cloud) service provider.

Providing secure wallet services has emerged as a central problem in transaction processing systems, a term which describes many modern computing systems. Modern computing systems occupy a basic place and play a fundamental role in providing support to data operations in communications, finance, manufacturing, travel, entertainment, cryptocurrencies and process control.

Modern computing systems usually comprise multiple computers in various arrangements, e.g., distributed, decentralized, etc. It is common for such systems to store user data redundantly, i.e., create several copies of a data item and store the copies on multiple computers to achieve security. In some cases, the data may also be fragmented, wherein the fragments may be stored redundantly. When a data item is requested by an authenticated user, the system re-assembles the fragments and responds accordingly. In some cases, the fragments may be encrypted prior to being stored.

The subject matter described herein improves upon the method of fragmenting user data (e.g., keys that are used in processing transactions), and storing and re-assembling the fragments upon request. Some embodiments of the subject matter described herein have the following properties.

1. [Opacity] No single computing entity in the overall system ever contains or gains knowledge of the entire personal data of the user, including the processes by which the user data is stored or re-assembled. That is, the user computing device is the only entity that contains the entire user data. Every other entity, at best, may only possess a (possibly encrypted) fragment.
2. [New Device] User computing devices may be replaced with newer devices without loss of user data.
3. [Loss of Device] The loss of the user computing device does not result in loss of access by the user.
4. [User Death] In case of user's death, user data may be retrieved by a properly designated beneficiary.

Note that the conventional method of storing and re-assembling fragments of data does not satisfy the above requirements. The entities receiving the data to be stored from the user computing device or re-assembling the fragments come into possession of the entire user data. Loss of a user computing device may result in the user not gaining access to his stored data. In case of death, the user computing device may become inoperable in the hands of beneficiaries.

The above requirements may be stated in general terms as defining a trust model between the system and the user according to which the only entity to ever possess the complete user data is the user's computing device. Furthermore, the user computing device is protected against loss of device and death of the user. Thus, the user is assured of the privacy, security, and continuity of his data.

Some embodiments of the subject matter described herein are described with reference to the storage of digital or cryptographic keys (or simply "keys") that are maintained in digital wallets. However, more generally, the methods, techniques and systems described herein apply to any data that is stored, processed, accessed or otherwise used by a user computing device.

The Role of a Custodial Entity

The invention assigns certain functions to an entity called the Custodian or the Custodial Entity, which may use one or more computer programs to perform most, if not all, of the assigned functions. We detail the assigned functions later but note the following herein.

A custodian may employ manual methods to ascertain and authenticate a user (or a beneficiary), e.g., by asking the user to furnish a government provided document establishing the user's identity. Alternatively, the custodian may use automated computer programs such as smart contracts to perform this and other functions. Smart contracts are computer programs that both express the contents of a contractual agreement and operate to implement the content, based on triggers that may be provided, for instance, by the users of the smart contract or extracted from a blockchain environment. Smart contracts may have a user interface and often emulate the logic of contractual clauses.

A custodian may employ manual methods to verify the deaths of users and the identity of their beneficiaries. In certain embodiments, such a manual method may be desirable.

However, we require that the custodian be constrained to observe the above requirements, viz., that the custodian does not come into possession of the user data. That is, the information possessed by the custodian is incomplete and insufficient to re-assemble or re-create the complete user dataset.

Example

The following example illustrates certain overall aspects of the methods, techniques and systems described herein. We omit technical and full details, which are presented later.

User Alice has a wallet that stores her private digital key associated with her account maintained in a (blockchain-based) cryptocurrency system. In an alternative embodiment, Alice's medical records may be stored in a digital library (cloud system) which can be accessed by a digital key stored in the memory of an app installed on her user computing device (e.g., smartphone).

To access her account, Alice needs her private key which, for example, is used by the (smart contracts of the) currency system to authenticate and validate her transactions. Alice is unable to access her account if she loses her private key or enters it erroneously because she will not be authenticated. (The smart contracts perform actions on the blockchain's ledger records and usually require users to authenticate themselves.) The information associated with Alice's account is assumed to be stored in a digital storage system accessible through her digital key.

Alice wishes to use the various methods, techniques and systems described herein to store her private key. To accomplish this, Alice first initiates a process on her user computing device, possibly using biometric information, or a passphrase. A series of computational steps, i.e., a protocol, ensues by which data elements are exchanged over one or more communication networks (wired, wireless, or any combination thereof) among the user computing device, the custodian, and a storage system. Without limitation, we assume that the storage system comprises multiple (storage) nodes. In embodiments, storing Alice's private key in the storage system implies that Alice's key is split into multiple fragments, the fragments being stored redundantly, possibly in encrypted form, on multiple nodes of the storage system.

Certain cryptographic informational elements associated with the fragments of the key are known to the user computing device, the storage nodes and the custodian. (The term "cryptographic informational elements" is meant to convey that the elements are inscrutable and preserve anonymity of users, e.g., in most cases they are randomly generated integers which allow arithmetical operations on them.) We refer to the cryptographic informational elements as indexical expressions since they can be used to retrieve the fragments, analogous to the manner in which indices are used to store and retrieve information in libraries and databases. However, our indexical expressions entail differences from the way conventional indicia are used to effectuate retrievals.

That is, the storage nodes know that they are storing some data but do not know the data or the owner of the data; only the indicia associated with the fragments are known and, unlike conventional indicia, the indicia known to the storage system do not uniquely identify the stored data. To identify a particular stored data fragment, the storage system needs to process the indicia known to it with information provided by the user (via the user computing device) and the custodian.

A comparison with the way a conventional library works will be illustrative.

A conventional library stores data (e.g., books) using indicia that uniquely identify the book. To retrieve a book, a user specifies the indicia to a librarian who effectuates the retrieval.

In the present case, several of the books may have the same associated indicia. To retrieve a book, a user provides additional indicia whose combination with the stored indicia uniquely identifies the stored data item, i.e., the book. A benefit of such an arrangement is that stored data items cannot be correlated with a particular user computing device (and hence a user). Once Alice's user computing device has retrieved all the needed fragments, it can re-assemble them into a key and then use the key to gain access to her account.

We shall discuss below cases involving re-assembling the key or other stored data if a user computing device is lost, replaced or if the user passes away.

Some aspects of the methods, techniques and systems described herein pertain to certain improvements to wallet technology used in transaction processing systems. Certain aspects of such improvements may be described, without limitation, as follows.

The Shamir Secret Sharing scheme (cf. "How to share a secret," *Comm. Of the ACM,* 22 (11): 612-613, 1979) shows how a data item or dataset known as the "secret" may be split into fragments in such a manner that not all the fragments may be needed for re-assembly; only a proper subset may be chosen by the user computing device (or the custodian). The present methods, techniques and systems operate independently of Shamir's work, but may use it if needed, e.g., for purposes of optimization.

In particular, we note that the Shamir scheme does not address requirements 1-4 stated above.

Some other related wallet implementations use cloud computing formulations for storing data. The data is then retrieved as and when needed. In such cases, the user trusts the cloud service provider with his keys. In our invention, no such trust need be placed on the service provider. The technology underlying our invention provides such a trust inherently. The cloud service provider never comes in possession of the whole key.

Certain implementations of wallet systems may use Shamir secret sharing technology and distribute the user data fragments amongst members of the user's social network or contact list. That is, devices used, operated or otherwise maintained by members of the user's social network or the user's contact list may function as storage nodes for storing fragments of the user data (e.g., a private key) that is to be stored.

The cloud-based implementations and contact list or social network-based implementation, by themselves, do not satisfy requirements 1-4 stated above.

Literature on this subject uses the term custodial wallet for a wallet that holds the private key of the user. Our notion of a custodian or custodial entity is different from such usage in that the custodian never has or comes to possess the private key or any user data. Our implementation of the wallet is closer in spirit to what is referred to as a non-custodial wallet in the literature though we note that our technology also differs from such standards.

Certain so-called threshold signature schemes used in wallets allow the user data to be re-assembled by m of n (m<n) participating nodes, i.e., any subset of cardinality n can re-assemble. If such schemes are used to satisfy requirements 1-4 above, the minimum number of nodes that can re-assemble the user data is 2 since we need the user and at least one other party to re-assemble in case of lost device, etc. In our wallet, the minimum number is 1 since the custodian does not have the capability to re-assemble; it only has the capability to provide data elements that enable the user (or his/her beneficiary) to re-assemble. In other words, we have a 1 of n threshold scheme in which one participant is distinguished (the user's wallet), but who is dependent on a data element provided by one of the other participants. In practice, the needed data element can itself be provided by a multiparty signature scheme.

It is also possible in a m of n threshold scheme, where m is small, for the m parties to be served a subpoena (e.g., by a regressive regime) to produce information. But in our scheme, serving a subpoena to the participants holding the needed data element would not yield any useful information. Serving a subpoena to the owner of the user computing device would be, similarly, ineffective since without the needed data element the user computing device is unable to re-assemble. Thus, effectively, the subpoena will have to be served to all nodes of the network, which we assume is computationally impractical.

Key Derivation and Challenge Functions

A Key Derivation Function (KDF) is a pseudorandom function that derives one or more keys (sometimes called encryption or secret keys) from a password or a passphrase provided by the user, i.e., consumer. An early example is described for the UNIX operating system by Morris and Thompson (cf. "Password Security: A Case History," R. Morris, K. Thompson, Bell Laboratories, Apr. 3, 1978; see also *Comm. ACM*, Vol. 22, Issue 11, November 1979.) More recent examples can be found in the article entitled "Data Privacy" by M. Bezzi et. al (cf. J. Camenish, M., et. al 2011, "Privacy and Identity Management for Life," *Springer*, ISBN 9783642203176).

A Hash-based Key Derivation Function (HKDF) is a type of key derivation function that uses a particular hash-based message authentication code, e.g., HMAC-SHA256. The latter belongs to a family of (irreversible) functions provided by the US National Institute of Standards and Technology (NIST). The term irreversible function means that the function's output cannot be used to derive it's input without expending inordinately large amount of computing resources. As an example of the use of SHA-256, an input (called a message) is converted by the function SHA-256 into a unique random series of bits (called the digest). The term unique refers to the property of SHA-256 to generate different digests for different messages and to generate the same digest for the same message. That is, SHA-256 is said to be collision-free.

A challenge-response function is a family of protocols in which one party presents a question ("challenge") and another party must provide a valid answer ("response") to be authenticated. (See cf. RFC 1994 PPP Challenge Handshake Authentication Protocol—CHAP.) As used herein, a user is required to choose a challenge (e.g., a phrase that the user can remember and re-produce at a subsequent time on-demand).

To initiate the protocol described below (and as mentioned in the simple example above), the user (e.g., Alice) may be required to use her fingerprint (or other biometric information, or a password or passphrase) as input to a suitably chosen HKDF, resulting in the generation of a key (using the key derivation functionality) also known as a digest.

Properties of Indexical Expressions

We require indexical expressions to satisfy certain properties. We explain the nature of these properties through a series of examples related to the storing of a single fragment of (Alice's) key or other data, say fragment1.

[Joint Property] Since we do not want any single entity to possess or otherwise know all the values of the indexical expressions associated with fragment1, we want the indexical expressions to be jointly held by more than one entity, e.g., the user computing device and the custodian. That is, each entity involved in the protocol will only possess or otherwise know a proper subset of all the values of the indexical expressions needed to retrieve the fragment.

[Irreversible] We require that the inputs used to derive the values of the indexical expressions may not be inferable from the latter.

[Non-Correlative] We require that the values of the indexical expressions (associated with stored fragments) cannot be correlated with a known user computing device, say Alice's user computing device.

[Private] We require that the values of the indexical expressions do not reveal any information about the user, say Alice.

We use the following method for constructing indexical expressions satisfying the above properties.

An indexical expression will consist of n-components (n>1) for a protocol with "n" participants or entities. For example, in the protocol described below, there are 3 entities, i.e., user computing device, custodian and storage system (nodes). Each component itself will consist of a binary representation of suitably generated integers.

To ensure computational irreversibility, the components of an indexical expression may use the discrete log property, i.e., an index integer "x" will be represented in the form $g^x$ mod N where g, N are suitably large prime numbers. It is known in the literature that the discrete log problem ensures computational irreversibility (cf. J. Camenisch: Group Signature Schemes and Payment Systems based on the Discrete Logarithm Problem, ETH Series in Information Security and Cryptography 1998, ISBN 978-3896492869; see also Shor, Peter 1997 "Polynomial-Time Algorithms for Prime Factorization and Discrete Logarithms on a Quantum Computer," *SIAM Journal on Computing* 26 (5): 1484-1509).

An alternative way to ensure computational irreversibility is to use well-known irreversible functions such as SHA-256 available from the National Institute of Standards and Technology (NIST) or a challenge-response protocol using a cryptographic nonce. (See cf. Henk C. A. van Tilborg; Sushil Jajodia (8 Jul. 2014). *Encyclopedia of Cryptography and Security. Springer Science & Business Media. ISBN* 978-1-4419-5906-5.)

To ensure that the stored fragments of a key are non-correlative (with the user computing device), we require that the indexical components associated with stored key fragments to not be free of collisions. That is, fragments from more than key may have the same indexical components.

To ensure user privacy, we require that inputs provided by the user are anonymized by utilizing suitably chosen HKDF functions such as SHA-256 or SHA-512, etc.

The Protocol for Storing Data

Figure 1:
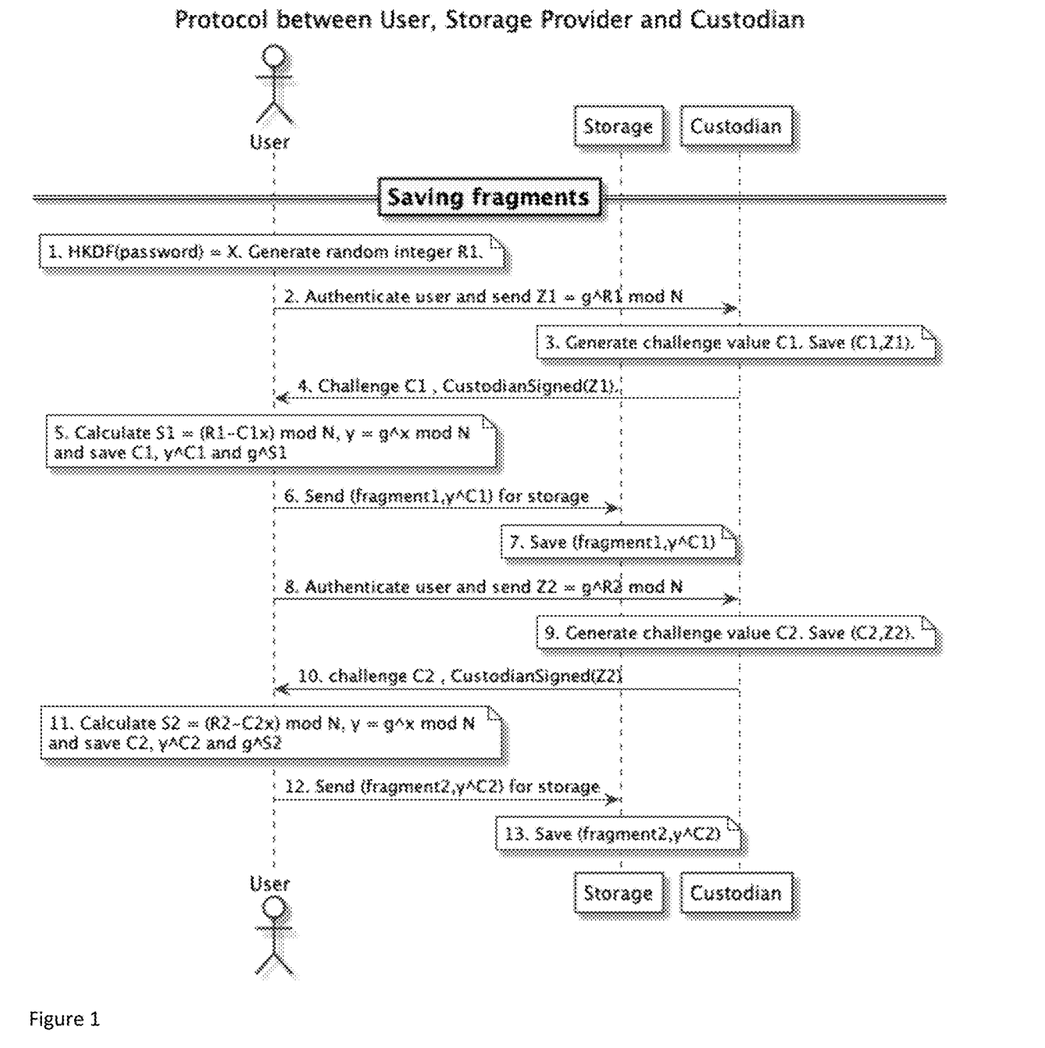
FIG. 1 shows one example of the protocol for storing user data fragments.

One example of a suitable protocol to store user data that satisfies all four of the properties of the indexical expressions enumerated above is shown in FIG. 1. Of course, those of ordinary skill will recognize that the functional forms of the various indexical expression may differ in different implementations and that the function forms presented below are provided by way of illustration only. More generally, the functional forms of the various indexical expressions are only limited by the requirement that they satisfy the four properties described above. The entities that are involved, e.g. the user computing device, the custodial entity and the storage system are all assumed to be in communication with one another over any suitable combination of wired and/or wireless communication networks.

Note that "g" and "N" are suitable prime integers. (The term "suitable" refers to the size of the chosen integers which determines the amount of computational effort and resources need to "break" the encryption, i.e., infer or guess the encryption key; cf. Foundations of Cryptography, O. Goldreich, Volume 1, Cambridge University Press, 2001.) Without loss of generality, we assume that the user computing device has executed a known procedure for fragmenting the user data (e.g., key) that is to be stored as two fragments, "fragment1" and "fragment2." For example, in some embodiments the previously cited method due to Shamir may be used.

Method: [Protocol for Storing Data]:

Provisioning Step:

User computing device is provisioned with integers g, N and the function HKDF (or some other suitable key derivation function). It is also provisioned with a random integer generating function.

The custodian is provisioned with a "challenge" function.

1. The user of the user computing device inputs the password (or his/her biometric data, e.g., fingerprint) to the HKDF function to generate digest "X." The user causes the user device to generate a random integer $R_1$.
2. The user computing device authenticates the user and sends the value $Z_1(=g^{R1}$ mod N) to the custodian. Z1 represents the functional form of one of the indexical components. Note that only the value of Z1 is sent to the custodian, not the functional form of Z1.
3. Custodian uses the "challenge" function to generate value $C_1$ based on the challenge-response exchange with the user (and thus $C_1$ is generated with input provided by the user) and saves $C_1$ and the received value $Z_1$. (These saved values will be used as described below in case the user computing device is lost.)
4. The custodian signs $Z_1$(signed $Z_1$), sends it and $C_1$ to the user computing device. Note: $Z_1=g^{R1}$ mod N is an indexical component created from the input provided by the user and signed by the custodian.
5. The user computing device calculates values $S_1=(R_1-C_1 x)$ mod N, $y=g^x$ mod N and saves $C_1$, $y^{C1}$ and $g^{S1}$. $y^{C1}$ and $g^{S1}$ represent the functional forms of the remaining two indexical components employed in this example. As previously mentioned, only their values and not their functional forms will be communicated to the other entities involved in the protocol.
6. The user computing device sends the fragment to be stored, say "fragment1," along with the value of indexical component $y^{C1}$ to the storage system for storage. Note: $y^{C1}$ is an indexical component created from input provided by the user and sent to the storage system (node).
7. The storage system receives "fragment1" and the value $y^{C1}$ and stores the indicated fragment with associated indexical component $y^{C1}$.

Similarly, steps 8-13 may be used to store "fragment2" along with the indexical component $y^{C2}$. (Note that the custodian will generate $C_2$ using the challenge function based on input provided by the user; the user may choose the same challenge phrase as before or choose a different challenge phrase. Note further that the custodian saves the values C2 and Z2 in step 9; these will be used later in case the user computing device is lost.)

Note that at the conclusion of the above method, the following situation holds.

The storage system has "fragment1", indexical component $y^{C1}$ stored on some node. (It also has "fragment2" and indexical value $y^{C2}$ stored on some node.)

The user computing device has the indexical component $g^{S1}$. It also has the indexical component $Z_1$ which it generated and a signed copy of $Z_1$ which it received from the custodian. Similarly, in case of "fragment2," it has Z2 and (signed Z2).

Custodian has C1 which it generated from input provided by the user; it also has the value of the indexical component $Z_1$ which it received from the user. $Z_1$ is an indexical component held by the custodian which it provides to the user computing device along with a signed copy. (In principle, it is not necessary that $Z_1$ be provided to the user computing device; the latter could request it as and when needed. Sending $Z_1$ to the user computing device improves the efficiency of the protocol since it reduces network traffic. We sign $Z_1$ so that when it is provided, e.g., to the storage system, the latter can trust it by verifying the signature.) Similarly, custodian has C2, Z2.

The Protocol for Re-Assembling Data Stored by the User Computing Device

Figure 2:
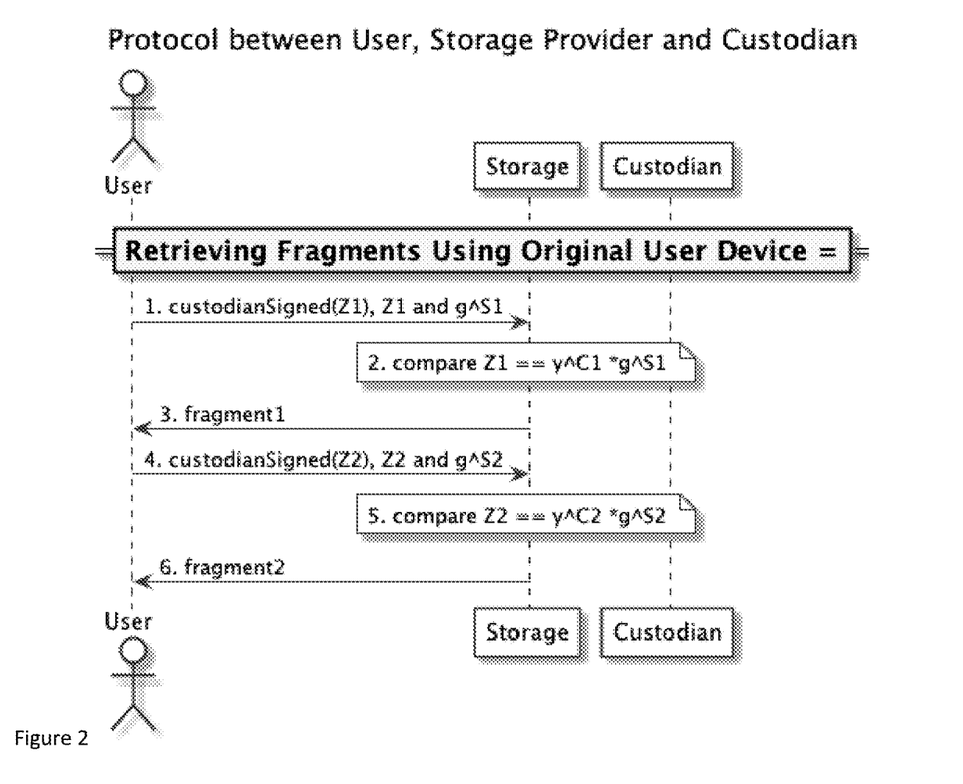
FIG. 2 shows one example of the protocol for retrieving stored data fragments employing the user computing device that was used to store the fragments.

FIG. 2 shows one example of the steps required to retrieve and reassemble "fragment1" and "fragment2" that were stored using the illustrative method of FIG. 1.

1. To retrieve "fragment1," the user computing device sends "custodian (signed $Z_1$)," and the values of the indexical components $Z_1$ and $g^{S1}$ to the storage nodes whose identifiers were received in step 7 of FIG. 1.
2. The storage nodes verify the custodian's signature of $Z_1$. Next, for each stored fragment, we multiply its associated indexical component value with the indexical component value received from the user computing device and check that it equals the value of indexical component $Z_1$. That is, we find all fragments for whom the equality $Z_1 = y^{C1} * g^{S1}$ is true. Note: There may be multiple stored fragments with the same $y^{C1}$ indexical component.
3. The storage nodes return all fragments to the user device for which the equality relation in step 2 is true. If no such fragments are found, a failure exception is raised.
4. Similar to step 1, the user computing device sends the values "custodian (signed $Z_2$), $Z_2$, and $g^{S2}$ to the storage nodes whose identifiers were received in step 13 of FIG. 1.
5. The storage nodes verify the custodian's signature of $Z_2$ and returns all fragments for which the equality $Z_2 = y^{C2} * g^{S2}$ is true.

It is to be noted that "fragment1" is only retrieved based on "matching" the product of the value of the indexical component $y^{C1}$ (which is equal to $g^{C1x}$ mod N) obtained from input of the user (via the user computing device) and the value of the indexical component $g^{S1}$ with the value of the indexical component $Z_1$ supplied by the custodian (and also based on input provided by the user). Furthermore, $Z_1$ can be trusted by the storage system since it is signed by the custodian. Thus, in essence, indexical components held at the storage system combined with indexical components from both the custodian and the user computing device contribute to a successful retrieval of "fragment1": likewise, for "fragment2."

The Protocol for Re-Assembling Stored Data for Lost User Computing Device

We assume the original user computing device used to store fragments has been lost and the user acquires a new user computing device. The new user computing device is pre-provisioned with the function "HKDF," the random integer generating function, and the prime integers g, N. In this case, the custodian may, optionally, require users to authenticate themselves using some manual methods, e.g., using a government issued identification credentials. Such manual steps may in fact be desirable since they add an additional level of security to the process. Note that the custodian has previously (FIG. 1) been provisioned with a challenge function and the user remembers the challenge(s) he/she had provided to the custodian.

1. The user inputs his/her password (or biometric information, e.g., fingerprint) into the HKDF function which produces the digest value "X". Note that this value is the same as in FIG. 1 since the input to HKDF is unchanged, i.e., the user inputs the same password or biometric data and the HKDF function has the non-collision property. The user computing device is also used to generate random integers $R_3$ and $R_4$. In the steps described below, we interleave the descriptions related to the retrieval of the two fragments.)
2. The user computing device authenticates the user and sends the value $Z_3 = g^{R3}$ mod N and the value $Z_4 = g^{R4}$ mod N to the custodian.
3. Custodian authenticates the user, possibly using some manual methods such as using a government issued ID. Once verified, the custodian retrieves the data saved in step 3 of FIG. 3 associated with the user.
4. The custodian sends the previously stored values $C_1$, $Z_1$, and (signed $Z_1$) to the user computing device.
5. (The user computing device knows X, g, and has received $C_1$ and $Z_1 = g^{R1}$ mod N.) It uses the received $C_1$ to calculate $g^{C1x}$. It then calculates $g^{S1} = Z_1/g^{C1x} = g^{R1-C1x}$ mod N and saves values $C_1$, $Z_1$, $g^{S1}$.
6. Custodian uses the "challenge" function to retrieve saved values related to the user's "fragment2." It finds $C_2$, $Z_2$.
7. The custodian sends (signed $Z_2$), $C_2$ and $Z_2$ to the user computing device.
8. The user computing device calculates $g^{S2} = Z_2/g^{C2x} = g^{R2-C2x}$ mod N and saves $C_2$, $Z_2$, $g^{S2}$.
9. To retrieve "fragment1," the user computing device sends the values "custodian (signed $Z_1$)," $Z_1$, and $g^{S1}$ to all the storage nodes in the storage system, e.g., it may send the values to the storage system which broadcasts them to all its nodes. (Note that unlike the case of re-assembling fragments using the original user computing device, wherein a limited number of storage nodes were queried for fragments, in this case we query all the storage nodes in the storage system since no entity knows the nodes where the fragments were stored. This is because the only entity that had this information, i.e., the original user computing device, is no longer available. This step may require a relatively large computational effort but is necessary to ensure satisfaction of the properties 1-4 stated above. It may also be assumed that losing user computing devices is a relatively infrequent occurrence, making the large computational effort less burdensome to the overall system.)
10. The storage nodes verify the custodian's signature of $Z_1$ and verifies that the values of $Z_1$, $y^{C1}$ and $g^{S1}$ satisfy the equality relation $Z_1 = y^{C1} * g^{S1}$.

Figure 3:
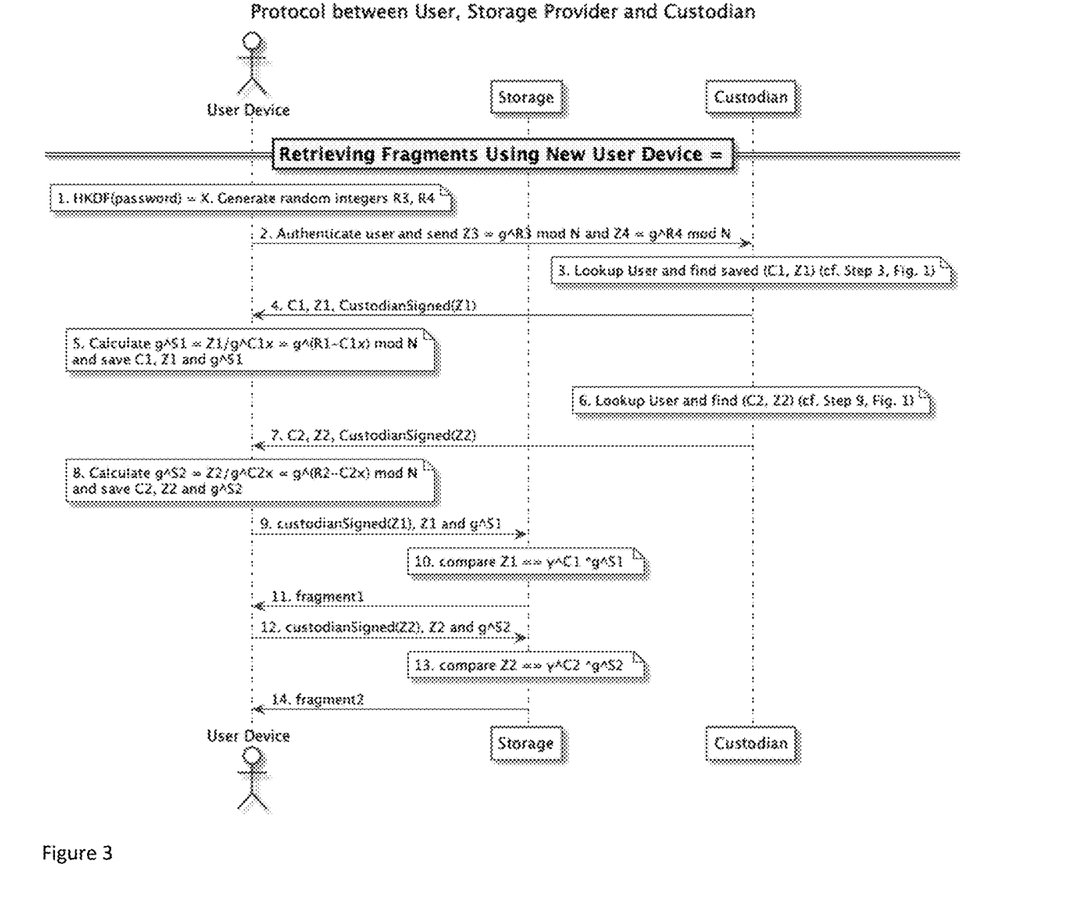
FIG. 3 shows one example of the protocol for retrieving fragments using a new user computing device that replaces a lost user computing device.

11. We return all fragments for which the equality relation in step 10 is true; if no such fragments are found, a failure exception is raised.

12. To retrieve "fragment2," the user computing device sends "custodian (signed $Z_2$)," $Z_2$, and $g^{S_2}$ to all the storage nodes.

13. The storage nodes verify the custodian's signature of $Z_2$ and returns (step 14) all fragments for which the equality relation $Z_2 = y^{C_2} * g^{S_2}$ is true. If no such fragment exists, a failure condition is raised.

Note that in step 2, the user device sends $Z_3$, $Z_4$ to the custodian. The presentation does not discuss the reasons underlying this action. The purpose is to allow the new user computing device to (re-)store user data (key) fragments (which will need to be done after re-assembly and use of the assembled key) and in preparation for that the user computing device sends $Z_3$, $Z_4$ to the custodian.

In turn, we could also have shown that the custodian generates a new $C_3$, $C_4$, $Z_3$, $Z_4$ etc. (cf. according to the method of FIG. 1) and sends the same to the user computing device.

Finally, a question may arise as to why not simply re-use the previously stored indexical elements at the custodian? We wish to preserve the non-correlative property. If the previously saved indexical elements were to be re-used, the repeated use may indicate a pattern of usage between the user computing device and the indexical elements (and the storage nodes where the fragments are stored) which could be exploited by malicious parties.

Replacing User Computing Devices with Newer Devices

In the event that the user acquires a new user computing device to replace the original user computing device that was used to store the fragments. If the original device is in working order, in many cases the new user computing device can be cloned from the original device. If the memory of the original device has been corrupted, we may use the process described in FIG. 3 for replacing a lost user computing device.

Death Benefit

In the event of user death, we assume that the original user has designated beneficiaries who may present themselves to the custodian. The beneficiaries are assumed to provide input to the custodian's challenge function which they may be prepared by the original user. As mentioned before, the challenge function may be an automated or manual process. Once the challenge function has been satisfied, the beneficiary device is used to re-assemble the user data as described in FIG. 3.

Illustrative Computing Environment

As discussed above, aspects of the subject matter described herein may be described in the general context of computer-executable instructions, such as program modules, being executed by a computer. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

Also, it is noted that some embodiments have been described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

The claimed subject matter may be implemented as a method, apparatus, or article of manufacture using standard programming and/or engineering techniques to produce software, firmware, hardware, or any combination thereof to control a computer to implement the disclosed subject matter. For instance, the claimed subject matter may be implemented as a computer-readable storage medium embedded with a computer executable program, which encompasses a computer program accessible from any computer-readable storage device or storage media. For example, computer readable storage media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). However, computer readable storage media do not include transitory forms of storage such as propagating signals, for example. Of course, those skilled in the art will recognize many modifications may be made to this configuration without departing from the scope or spirit of the claimed subject matter.

Moreover, as used in this application, the terms "component," "module," "engine," "system," "apparatus," "interface," or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediary components. Likewise, any two components so associated can also be viewed as being "operably connected", or "operably coupled", to each other to achieve the desired functionality.

The invention claimed is:

1. A method of sending previously stored data of a user to a user computing device, the stored data being stored in a storage system by the user computing device, comprising:
receiving, at the storage system, a first indexical component from the user computing device, the first indexical component being generated using a first user input, the first indexical component being an integer value and being derived using a computationally irreversible function such that the first user input is not derivable from the first indexical component, the storage system previously storing the stored data to be retrieved and a second indexical component associated with the stored data, the second indexical component being an integer value determined using a second user input and a first input obtained from a custodial entity, the second indexical component being derived using the computationally irreversible function such that the second user input and the first input obtained from the custodial entity are not derivable from the second indexical component, wherein the second user input is derived using a key generation function;

receiving, at the storage system, a third indexical component from the user computing device, the third indexical component being an integer value generated by the user computing device using the first user input and the first input obtained from the custodial entity such that the first user input and the first input obtained from the custodial entity are not derivable solely from the third indexical component integer;

locating, at the storage system, a storage location of the stored data using the first, second and third indexical components; and accessing, with the storage system, the stored data from the storage location; and comparing, at the storage system, the first indexical component to a product of the second indexical component and the third indexical component and only sending the stored data to the user computing device if the third indexical component matches the product of the second indexical component and the third indexical component.

2. The method of claim 1, wherein the second user input is derived using the key generation function that uses as input a user password or user biometric data.

3. The method of claim 1, wherein the first user input is a randomly generated integer.

4. The method of claim 1, further comprising receiving from the user computing device a version of a digitally signed version of the first indexical component that is digitally signed by the custodial entity.

5. The method of claim 1, wherein the first input obtained from the custodial entity is derived using a challenge-response protocol in which the custodial entity presents a challenge to the user of the user computing device to authenticate the user.

6. The method of claim 1, wherein the stored data represents one of a plurality of fragments of a private key of the user of the user computing device.

7. The method of claim 6, further comprising repeating the receiving, locating and accessing steps for each remaining one of the fragments such that the stored data is able to be reassembled from all the fragments that are received by the user computing device.

8. The method of claim 7, wherein the stored data is the private cryptographic key.

9. The method of claim 1, wherein the second indexical component has previously been received from the user computing device.

10. The method of claim 1, wherein the second indexical component is further determined using the first user input, the second indexical component being derived using the computationally irreversible function such that the first user input, the second user input and the first input obtained from the custodial entity are not derivable from the second indexical component.

11. A method for retrieving a stored data of a user of a second user computing device, the stored data being previously stored in a storage system by a first user computing device, comprising:

generating, with the second computing device, a second user input to be used to authenticate the user, wherein the second user input is derived using a key generation function;

sending, from the second computing device, the second input to a custodial entity;

receiving at the second computing device from the custodial entity, a first custodial input, a first indexical component and a version of the first indexical component digitally signed by the custodian, the first indexical component being generated by the first computing device using a first user input and being received by the custodial entity from the first user computing device, the first indexical component being an integer value and being derived using a computationally irreversible function such that the first user input is not derivable from the first indexical component, the storage system previously storing the stored data to be retrieved and a second indexical component associated with the data, the second indexical component being an integer value generated using the second user input and the first custodial input, the second indexical component being generated by the first user computing device and derived using the computationally irreversible function such that the second user input and the first custodial input are not derivable from the second indexical component;

generating, with the second computing device, a third indexical component, the third indexical component being an integer value using the first custodial input, the first user input and the first indexical component such that the first custodial input, the first user input and the first indexical component are not derivable solely from the third indexical component integer;

sending to the storage system from the second computing device the first indexical component, the digitally signed version of the first indexical component and the third indexical component;

comparing, at the storage system, the first indexical component to a product of the second indexical component and the third indexical component; and responsive to the sending, receiving at the second user computing device from the storage system the stored data only if the storage system verifies the digitally signed version of the first indexical component and only if the storage system determines that the first indexical component is equal to a product of the second indexical component and the third indexical component.

12. The method of claim 11, further comprising sending from the second computing device to the custodial entity a fourth indexical component that is to replace the first indexical component when next storing the stored data with the storage system, the fourth indexical component being an integer that is generated by the second computing device using a third user input.

13. The method of claim 11, wherein the second user input is derived using the key generation function that uses as input a user password or user biometric data.

14. The method of claim 11, wherein the first user input is a randomly generated integer.

15. The method of claim 11, wherein the first custodial input obtained from the custodial entity is derived using a challenge-response protocol in which the custodial entity presents a challenge to the user of the second user computing device to authenticate the user, the user being a beneficiary of an original user of the first user computing device.

16. The method of claim 11, wherein the stored data represents one of a plurality of fragments of a private key of the user of the user computing device.

17. The method of claim 11, wherein the stored data is a private cryptographic key.

18. The method of claim 16, wherein the stored data is one of the plurality of fragments of the private cryptographic key.

* * * * *